United States Patent Office 2,956,447
Patented Oct. 18, 1960

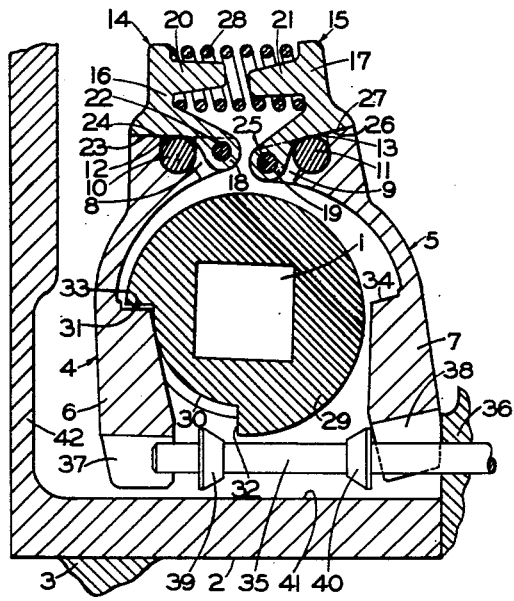
Oct. 18, 1960     G. T. McCLURE     2,956,447
LIMIT STOP MECHANISM FOR ROTATABLE SHAFT
Filed Oct. 30, 1957
INVENTOR.
GLENN T. McCLURE
BY
ATTORNEY

2,956,447

LIMIT STOP MECHANISM FOR ROTATABLE SHAFT

Glenn T. McClure, McKeesport, Pa., assignor to Westinghouse Air Brake Company, Wilmerding, Pa., a corporation of Pennsylvania Filed Oct. 30, 1957, Ser. No. 693,435

8 Claims. (Cl. 74—527)

This invention relates to limit stop mechanisms for holding a reversibly rotatable shaft in substantially one rotative limit position or another rotative limit position against torques tending to rotate said shaft reversely out of such limit positions.

According to the invention, two identical generally bellcrank-like latches are hingedly supported at their knees with a slight degree of vertical lost motion on respective fixed pins carried by a housing. These latches are so disposed that their identical one arms extend substantially horizontally toward each other from said pins and their identical other arms extend downwardly toward a thrust surface provided on the housing. The said one arm of each of said latches is pivotally connected to a spring-biased member that acts to normally rock the other arm of said latch into engagement with a collar fixed on the shaft so that a shoulder on said latch will tend to drop in behind a corresponding detent shoulder provided on the collar and said spring-biased member at the same time also acts to normally raise the latch toward its upper limit of vertical lost motion and out of contact with the thrust surface on the housing. If the shaft tends to rotate out of position after the latch shoulder has dropped in behind the detent shoulder, the latch will be pulled down relative to the pin through the vertical lost motion, with the result that thrust will be transmitted from the shaft to the housing by engagement of the detent shoulder with the latch shoulder and engagement of the lower end of the latch with the thrust surface, and such thrust will not be borne by said fixed pin. A reversely shiftable actuating rod is provided for selectively rocking either latch out of engagement with the collar against resistance of the spring acting on its corresponding spring-biased member, while permitting the shaft and collar to be rotated from one limit position to the other limit position in which the other spring-biased member can push its corresponding latch in behind the corresponding other detent shoulder.

In the accompanying drawing, Figs. 1 and 2 are elevational section views of a limit stop mechanism embodying the invention shown in a disengaged position and in an engaged position, respectively.

Description

In the accompanying drawing, there is shown an improved limit stop mechanism for holding a reversibly rotatable shaft 1 selectively in substantially one or the other of two rotative limit positions. This limit stop mechanism comprises a hollow sectionalized housing 2 suitably secured to a fixed member 3, and a pair of bellcrank-like latches 4, 5 of preferably identical configuration and comprising, respectively, depending arms 6, 7 and bifurcated or clevis-like arms 8, 9 that extend laterally at generally right angles from the upper ends of the corresponding depending arms. The latches 4, 5 are oppositely arranged such that their respective arms 8, 9 extend generally toward each other.

Pins 10, 11 are carried in fixed positions by the housing 2 at substantially equal horizontal distances from a vertical plane through the axis of the shaft. These pins 10, 11 pass through U-shaped slots 12, 13 which extend downwardly from the upper edges of the clevis-like arms 8, 9 where they join the arms 6, 7, said slots serving to permit some degree of vertical movement of the latches 4, 5 relative to the pins 10, 11 but confining the latches against horizontal movement so that the latches will be rockable relative to said pins, for reasons hereinafter to be explained.

A pair of generally inverted F-shaped members 14, 15 of preferably identical configuration, but opposingly arranged, comprise, respectively, upright arms 16, 17, laterally extending arms 18, 19 formed integrally with corresponding lower ends of the arms 16, 17, and laterally extending arms 20, 21 which are formed integrally with the arms 16, 17 intermediate their ends and thus are spaced above the arms 18, 19. Arm 18 curves downwardly into the clevis-like arm 8 of latch 4, and a pin 22 passes through the outer part of arm 8 and through the outer part of arm 18 for pivotally connecting the member 14 with the latch 4. At a point intermediate its left-hand and right-hand ends, the lower edge of member 14 rests on the pin 10 for permitting member 14 to rock on pin 10 to a position in which a flat surface 23 provided on the lower side of arm 16 abuttingly engages a corresponding flat surface 24 provided at the upper end of latch 4.

Similarly, arm 19 curves downwardly into the clevis-like arm 9 of latch 5, and a pin 25 passes through the outer part of arm 9 and through the outer part of arm 19 for pivotally connecting the member 15 with the latch 5; and at a point intermediate its left-hand and right-hand ends, the lower edge of member 15 rests on the pin 11 for permitting member 15 to rock on pin 11 to a position in which a flat surface 26 provided on the lower side of arm 17 abuttingly engages a corresponding flat surface 27 provided at the upper end of latch 5.

A helical bias spring 28 encircles the arms 20, 21 (which thus serve as spring guides) and bears against the members 14 and 15 for normally biasing said members in opposite directions about the pins 10, 11 to respective positions in which the surfaces 23, 24 and surfaces 26, 27 are engaged, as shown in Fig. 1. From the foregoing, it will be apparent that the axes of pins 10, 11, 22 and 25 are parallel to the axis of shaft 1, and that the pins 22, 25 are disposed between the pins 10, 11.

A stop limit defining collar 29, which is suitably mounted on a square shank of shaft 1 for rotation thereby, has a recess 30 preferably of uniform depth formed in its cylindrical outer surface. This recess is defined between two radial detent shoulders 31, 32 which may, for sake of illustration, be ninety degrees apart, although they may, if preferred, be any angular distance less than ninety degrees apart and up to one hundred eighty degrees apart. The latches 4, 5 have shoulders 33, 34 which, under conditions hereinafter to be described, are adapted to be selectively engaged by the detent shoulders 31, 32, respectively.

An actuating rod 35, which is shiftable reversely by such as a fluid pressure motor (not shown), has slidably guided contact with the wall of an aligned bore through one end wall 36 of the housing 2 and projects with clearance through generally vertical slots provided by yokes 37, 38 formed integrally with and defining the lower ends of latch arms 6, 7, respectively. Two spaced positioning collars 39, 40 are preferably formed integrally with that part of rod 35 which is disposed between the yokes 37, 38; said collars being of sufficient diameter to engage the inner sides of the yokes 37, 38 to cause the latches 4, 5 to be selectively rocked about the pins 10, 11 respectively, according to the direction of axial movement of said rod.

Operation

Assume initially that the shaft 1 has been rotated in a clockwise direction to one limit position by means (not shown) such as a fluid pressure motor or cable having an eccentric connection with said shaft. Assume further that the actuating rod 35 is in its right-hand limit position, which position, may, for sake of illustration, be defined by contact of the outer side of yoke 38 with the end wall 36 of housing 2 under action of the rightward force then being exerted on said yoke by said rod through the medium of collar 40. Under these assumed conditions, the limit stop mechanism will be in a disengaged position, in which it is shown in Fig. 1 of the drawing.

If the torque force pulling the shaft 1 in a clockwise direction to hold it in its said one limit position, in which it is shown in Fig. 1, is either intentionally or unintentionally released and the shaft should thereafter start to rotate in a counterclockwise direction, the detent shoulder 31 will successively engage the latch shoulder 33 and then push the latch 4 downward relative to pin 10, as permitted by the slot 12, against the opposing upward force then being exerted on said latch by spring 28 via arm 18 and pin 22, until the lower end of yoke 37 engages a flat thrust surface 41 provided on the housing 2 and thus prevents further counterclockwise rotation of the shaft; whereupon the limit stop mechanism will be in its engaged position, in which it is shown in Fig. 2. With the mechanism in this position, any torque force tending to rotate the shaft 1 counterclockwise will be transmitted via the latch 4 to the housing and will not be borne by the pin 10, thereby desirably permitting the pin to be of relatively small diameter.

To free the shaft 1 so that it may be rotated counterclockwise, a torque force is preferably applied thereto to initially pull the shaft in a clockwise direction back to its aforementioned one limit position, especially if there is any appreciable counterclockwise moment on the shaft 1, so as to take the thrust off the latch 4. The spring 28 will thereupon rock member 14 counterclockwise on pin 10 and exert an upward force on pin 22 which will pull the latch 4 upwardly relative to the fixed pin 10, as permitted by slot 12, and thus carry the yoke 37 out of contact with thrust surface 41, until the surfaces 23 and 24 engage each other; whereupon further movement of the latch 6 and member 14 will cease because latch arm 6 will then be in engagement with the bottom of recess 30. The limit stop mechanism will then once again be in the disengaged position in which it is shown in Fig. 1.

Meanwhile, throughout the operations thus far described, yoke 38 of latch 5 will be held in contact with the end wall 36 by the force exerted on said yoke by rod 35 through the medium of collar 40, and thus cause latch surface 27 to be held in a fixed position. The latch 5 will have been drawn upward, as permitted by slot 13, due to the upward force operatively exerted thereon by the spring 28 via member 15 and pin 25, and surface 26 will be in engagement with latch surface 27, as shown in both Figs. 1 and 2.

In order to rotate the shaft 1 counterclockwise to its other limit position, the shaft should preferably first be pulled to its aforementioned one limit position to relieve any thrust on latch 4 and thus actuate the limit stop mechanism to the position shown in Fig. 1, as above described. Then the actuating rod 35 is shifted to its left-hand limit position for causing collar 39 to engage yoke 37 and thus rock latch 4 clockwise about pin 10 against opposition of spring 28 to a position in which the outer side of the yoke 37 engages the opposite end wall 42 of the housing, and the latch surface 24 engages surface 23 of member 14, and the latch arm 6 is completely withdrawn from recess 30. With the latch arm 6 thus withdrawn from recess 30, the collar 29 and hence the shaft 1 may be rotated counterclockwise to its other limit position. During the initial phase of this counterclockwise rotation of shaft 1 and collar 29, the part of latch arm 7 below shoulder 34 will bear against the cylindrical exterior of said collar under action of spring 28 which acts through member 15 and pin 25, to rock latch 5 clockwise on pin 11, it being noted that the collar 40 of rod 35 will now be a substantial distance leftward of the yoke 38 and thus not interfere with such rocking of the latch; and then, as detent shoulder 32 is rotated counterclockwise past the then stationary latch shoulder 34, the part of latch arm 7 below shoulder 34 will drop into the recess 30 under action of spring 28, it being preferable that the shoulder 32 will be rotated just enough past shoulder 34 to assure that said latch arm will freely move into contact with the bottom of recess 30 without any possibility of hangup or binding. With latch arm 7 engaging the bottom of recess 30, clockwise movement of the latch 5 about pin 11 will cease and hence latch surface 27 will be held stationary. Meanwhile, spring 28 acting through member 15 and pin 25 will hold the latch 5 raised such that the base of slot 13 will substantially engage the underside of pin 11 and this, in turn, will assure that the lower end of yoke 38 will be spaced slightly above the thrust surface 41 during the above-described clockwise rocking of latch 5. Hence, with the shaft 1 in its aforementioned other limit position, the latch 5 and member 15 will assume respective positions which correspond to those shown for latch 4 and member 14 in Fig. 1 of the drawing.

From the foregoing, it will be understood that if the torque force pulling the shaft 1 and thereby the collar 29 counterclockwise to hold the shaft 1 in its aforementioned other limit position is released, either intentionally or unintentionally, and the shaft should thereafter start to rotate clockwise, the detent shoulder 32 will engage latch shoulder 34 and shift the latch 5 downward relative to the pin 11, as permitted by slot 13, with the result that the thrust of any force tending to cause such clockwise rotation of the shaft out of its other limit position will be transmitted from the shaft directly to the thrust surface 41 via the latch arm 7, and this thrust will not be borne by pin 11.

It will also be understood that, to rotate the shaft 1 clockwise back to its above-described one limit position, in which it is shown in Fig. 1, the shaft 1 should preferably first be freed or unlatched by pulling it to and holding it in its opposite limit position; then actuating rod 35 should be shifted rightward to its previously-defined right-hand limit position; and then the shaft may be rotated clockwise back to its one limit position.

It is to be noted that the clearance between the surfaces 31, 33, as shown in Fig. 1, is somewhat exaggerated for clarity of showing and that, the detent shoulder 31 should preferably be pulled above latch shoulder 33 just enough to assure that the latch arm 6 may freely and without binding move into contact with the bottom of recess 30 when the shaft is rotated to its one limit position, in the same manner as above described in connection with movement of latch arm 7 into contact with the bottom of said recess upon rotation of the shaft to its other limit position. This clearance between shoulders 31, 33 and 32, 34 in the respective limit positions of shaft 1 is, of course, as small as possible so that any rotation of the shaft out of it corresponding limit position prior to restraint of the shaft by the latches 4 or 5 will be negligible.

It should also be noted that if the limit stop mechanism is associated with a shaft which is not normally subjected to any appreciable torque or moment tending to rotate it out of its one or other limit position when once attained, and it is therefore unlikely that any appreciable thrust force will be transmitted via the latches 4 or 5 to the housing, the shaft need not necessarily be pulled to one of its limit positions prior to actuation of rod 35. This is true because if the yoke 37 or 38 is in contact with the thrust surface 41 but there is no appreciable thrust imposed on the corresponding latch, the actuating rod 35 may shift such latch because spring 28 will still be effective to tend to raise the corresponding latch, through the member 14 or 15 and pin 22 or 25, such that the bottom of slot 12 or 13 will substantially engage the underside of the respective pin 10 or 11 and thus assure that the yoke 37 or 38, as the case may be, will not drag along the thrust surface 41; it being noted that even with maximum clearance between the pin 10 and base of slot 12, as shown in Fig. 2, the linear distance between the axis of pin 10 and the lower edge of yoke 37 is great enough so that upon a slight degree clockwise swinging of latch 4 relative to pin 10, the lower end of the latch will rapidly move out of contact with surface 41.

Having now described the invention, what I claim as new and desire to secure by Letters Patent is:

1. In a limit stop mechanism for a rotatable means having a detent shoulder rotatable therewith, the combination of a latch hingedly swingable in a plane transverse to the axis of the rotatable means, means providing a limited degree of lost motion movement of said latch within said plane, means providing a stationary thrust surface, resilient means biasing said latch in one direction through such lost motion for normally holding the latch out of contact with the thrust surface, resilient means biasing the latch into operative contact with the rotatable means, said latch having a latch shoulder which is normally slightly spaced from the detent shoulder during such operative contact, said latch shoulder being contacted by the detent shoulder upon slight rotation of the rotatable means one way for operatively moving said latch in a direction opposite said one direction through such lost motion until the latch contacts the thrust surface and restrains the rotatable means against further rotation said one way, whereby the force tending to rotate the rotatable means said one way will be transmitted via the latch to the stationary thrust surface.

2. The combination according to claim 1, including means for swinging said latch out of contact with said stationary thrust surface and out of contact with the rotatable means for permitting rotation of the rotatable means said one way.

3. In a limit stop mechanism for a rotatable shaft, the combination of means secured for rotation with the shaft and providing a detent shoulder, a fixed pin having an axis parallel to that of the shaft, a latch hingedly rockable on said fixed pin, means providing a limited degree of lost motion of said latch relative to said fixed pin in a plane perpendicular to the axis of said fixed pin, means providing a stationary thrust surface, means exerting a biasing moment of force on said latch for normally causing said latch to move in one direction through such lost motion for withdrawing said latch from contact with said thrust surface and also normally biasing the latch into contact with the first mentioned means, said latch having a latch shoulder which is normally slightly spaced from said detent shoulder but which under the influence of a force operative to rotate the shaft one way is contacted by said detent shoulder for causing said latch to move in a direction opposite said one direction through such lost motion and effect contact of the latch with the thrust surface so as to thereby prevent the shaft from rotating further said one way and cause said force to be transmitted from the shaft via the latch to the thrust surface, rather than being borne by said fixed pin.

4. In a limit stop mechanism for holding a rotatable shaft in a desired position against rotation in one direction, the combination of means secured for rotation with the shaft and providing a detent shoulder, fixed means, a pin carried by said fixed means and having an axis parallel to that of the shaft, a latch having two integrally formed arms extending at generally right angles to each other and at substantially the junction of said arms being rockable relative to said pin, means providing a limited degree of lost motion of said latch relative to said pin in a plane perpendicular to the axis of said pin, means providing a thrust surface contactable by one of said arms, resilient means for exerting a biasing moment of force on the other of said arms for normally causing said latch to move through said lost motion and hold said one arm out of contact with said thrust surface, said one arm having a latching shoulder, resilient means for normally biasing said one arm into contact with the first-mentioned means, said detent shoulder normally being spaced slightly from said latching shoulder during the last-mentioned contact but movable into contact with said latching shoulder upon slight rotation of the shaft in said one direction for moving said latch through such lost motion and effecting contact of the latch with the thrust surface, whereby a force tending to rotate the shaft in said one direction will be transmitted via the latch to the thrust surface and not be borne by said pin and the shaft will be held in its desired position.

5. A limit stop mechanism for a reversibly rotatable shaft, said mechanism comprising means rigidly associated with the shaft for rotation thereby and providing a pair of detent shoulders so spaced angularly as to define the angular distance between two rotative limit positions of the shaft, a pair of spaced fixed pins each having an axis parallel to the axis of the shaft, a pair of latches each hingedly swingable on a respective one of said fixed pins, means for each latch for providing a limited degree of lost motion movement of such latch relative to its respective fixed pin in a plane perpendicular to the axis of such fixed pin, means defining a stationary thrust surface, resilient means for biasing each latch through such lost motion connection for withdrawing such latch from contact with the thrust surface, resilient means for biasing each latch into contact with the first-mentioned means, each latch having a shoulder which is capable at different times of dropping in behind a respective one of the detent shoulders, and actuating means for controlling selective withdrawal of the latches from contact with the first-mentioned means, said actuating means being operative to withdraw one of said latches from the first-mentioned means and permit the first-named resilient means to bias said one latch through such lost motion and at the same time permit the other of said latches to be biased into contact with the first-mentioned means, said first-mentioned means and thereby the shaft thereupon being rotatable one way for permitting the shoulder on said other latch to drop in behind the corresponding detent shoulder, whereupon upon slight subsequent rotation of the shaft the other way the last-mentioned detent shoulder will contact said shoulder on said other latch and move the latter through its lost motion against the bias of the first-mentioned resilient means until said other latch contacts the thrust surface and transmits thrust from the shaft to the thrust surface via said other latch, said actuating means thereafter being operable in similar manner to withdraw said other latch from the first-mentioned means and free said one latch for permitting rotation of the shaft said other way to a position in which the mechanism will constrain said shaft against rotation said one way.

6. A limit stop mechanism for holding a reversibly rotatable shaft in substantially one or the other of two rotative positions, said mechanism comprising means rigidly associated with the shaft for rotation thereby and providing a pair of detent shoulders so spaced angularly as to define the angular distance between such rotative positions, a pair of spaced fixed pins each having an axis parallel to the axis of the shaft, a pair of latches each rockably mounted intermediate its ends on a respective one of said fixed pins, means for each latch for providing a limited degree of lost motion of such latch relative to its respective fixed pin in a plane perpendicular to the axis of such fixed pin, means defining a stationary thrust surface, a bias spring, a pair of spring-biased members each pivotally connected to a corresponding one of said latches and each so biased by said spring as to pull its respective latch in one direction through the lost motion connection for withdrawing such respective latch from contact with the thrust surface and also tend to effect contact of such respective latch with the first-mentioned means, each of said latches having a shoulder which is contactable by a corresponding detent shoulder, and reversely shiftable means for selectively withdrawing either of the latches from the first-mentioned means, said reversely shiftable means being operative to withdraw one of said latches to permit rotation of the shaft and first-mentioned means one way for enabling the shoulder on the other of said latches to drop in behind the corresponding detent shoulder, such that any force thereafter tending to rotate the shaft the other way will promptly cause contact of the last-mentioned detent shoulder with the shoulder of said other latch and move the latter in the opposite direction through its lost motion until said other latch contacts the thrust surface and thus prevents rotation of the shaft said other way.

7. In a limit stop mechanism for holding a rotatable means in substantially one or the other of two rotative limit positions defined by the angular spacing of two detent shoulders provided on the rotatable means, the combination of a pair of latching means each having shoulders which may overlie a corresponding one of the detent shoulders, and each rockably supported for movement in a plane perpendicular to the axis of the rotatable means and each having means providing a lost motion connection permitting limited movement thereof within said plane, means providing a thrust surface, means resiliently biasing each of said latching means toward contact with the rotatable means and also through the lost motion connection in a direction away from the axis of the rotatable means, and actuating means for selectively withdrawing either of said latching means from contact with the rotatable means, said actuating means being operative to withdraw one of said latching means from the rotatable means and permitting rotation of the latter one way from one to the other of its limit positions and thus enabling the shoulder on the other of said latching means to drop in behind the corresponding detent shoulder, such that any force thereafter tending to rotate the rotatable means the other way will promptly cause contact of the last-mentioned detent shoulder with the shoulder of said other latching means and move the latter in the opposite direction through its lost motion connection until said other latching means contacts the thrust surface and thus restrains the rotatable means against rotation said other way and operatively transmits such force from the rotatable means to the thrust surface.

8. A limit stop mechanism for holding a reversibly rotatable shaft in substantially one or the other of two rotative positions, said mechanism comprising means rigidly associated with the shaft for rotation thereby and providing a pair of detent shoulders so spaced angularly as to define the angular distance between such rotative positions, a pair of spaced fixed pins each having an axis parallel to the axis of the shaft, means providing a thrust surface, a pair of bellcrank-like latches having respective one arms extending generally toward each other and respective other arms extending generally toward the thrust surface, each of said latches being rockably mounted on a respective one of said fixed pins, means for each latch for providing a limited degree of lost motion movement of such latch relative to its respective fixed pin in a plane perpendicular to the axis of such fixed pin, a pair of other pins, a bias spring, a pair of spring-biased members each pivotally connected via a respective one of said other pins to said one arm of a respective latch and rockable on a corresponding one of said fixed pins, each of said members being so biased by said spring as to pull its respective latch through the lost motion in one direction for withdrawing such latch from contact with the thrust surface and also biasing such latch toward contact with the first-mentioned means, each of said other arms having a shoulder which may overlay a corresponding one of the detent shoulders, and unlatching means for selectively withdrawing either of the latches from the first-mentioned means, said unlatching means being operative to withdraw the other arm of one of the latches from the first-mentioned means and permit the spring-biased member for the other latch to bias the other arm thereof into contact with the first-mentioned means, said first-mentioned means and thereby the shaft thereupon being rotatable counterclockwise to its one rotative position, the shoulder on said other latch being operable during such counterclockwise rotation to drop in behind the corresponding detent shoulder, whereupon upon slight subsequent clockwise rotation of the shaft the last-mentioned detent shoulder will contact said shoulder on said other latch and move the latter through its lost motion until said other latch contacts the thrust surface and thereby prevents further clockwise rotation of the shaft, said unlatching means thereafter being operable in similar manner to withdraw said other latch and free said one latch for permitting clockwise rotation of the shaft to its other rotative position in which the mechanism will prevent counterclockwise rotation of the shaft.

References Cited in the file of this patent

UNITED STATES PATENTS

| 880,545 | Leavitt | Mar. 3, 1908 |
| 2,197,284 | Wooster | Apr. 16, 1940 |
| 2,488,637 | Moss | Nov. 22, 1949 |

FOREIGN PATENTS

| 44,304 | Switzerland | Apr. 8, 1908 |